United States Patent [19]

Eickhorst

[11] Patent Number: 4,491,306
[45] Date of Patent: Jan. 1, 1985

[54] HOLDING CURVED WORKPIECES

[75] Inventor: Helmut Eickhorst, Varel, Fed. Rep. of Germany

[73] Assignee: Vereinigte Flugtechnische Werke GmbH, Bremen, Fed. Rep. of Germany

[21] Appl. No.: 393,058

[22] Filed: Jun. 28, 1982

[30] Foreign Application Priority Data

Jul. 7, 1981 [DE] Fed. Rep. of Germany ....... 3126720

[51] Int. Cl.³ .......................................... B23B 31/30
[52] U.S. Cl. ...................................... 269/21; 269/71; 269/76; 269/75
[58] Field of Search ................ 269/21, 71, 76, 75; 279/3; 294/64 R; 51/235

[56] References Cited

U.S. PATENT DOCUMENTS

| 3,167,326 | 1/1965 | Heessels | 279/3 |
| 3,207,503 | 9/1965 | Clover | 269/21 |
| 3,833,230 | 9/1974 | Noll | 294/64 R |
| 3,838,865 | 10/1974 | Roberts et al. | 269/21 |

FOREIGN PATENT DOCUMENTS

| 91403 | 2/1938 | Sweden | 294/64 R |
| 146868 | 9/1954 | Sweden | 269/21 |

Primary Examiner—Robert C. Watson
Attorney, Agent, or Firm—Ralf H. Siegemund

[57] ABSTRACT

Large, spherically preshaped, thin workpieces are held and clamped in discrete, well-defined points under utilization of holding and clamping elements in which a portion of a head is universally pivotable about a point being the center of a sealing rim for a plenum chamber adjacent the engaging workpiece in which plenum chamber high pressure is established so that the workpiece can slide above the rim on an air cushion while it is being held through application of below-atmospheric suction pressure in the plenum.

10 Claims, 5 Drawing Figures

U.S. Patent   Jan. 1, 1985   4,491,306
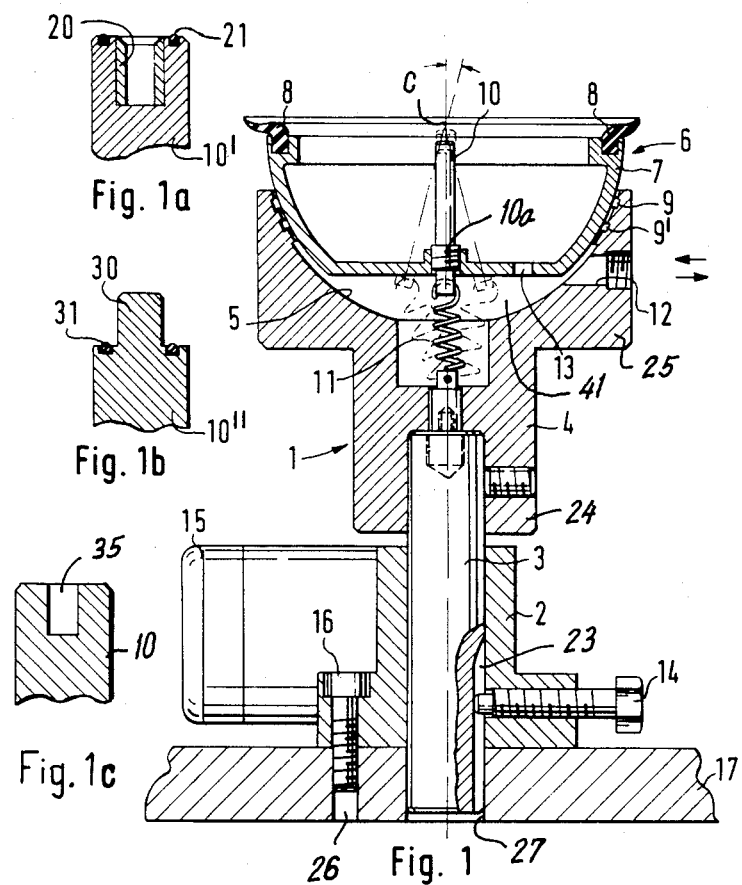
Fig. 1a
Fig. 1b
Fig. 1c
Fig. 1
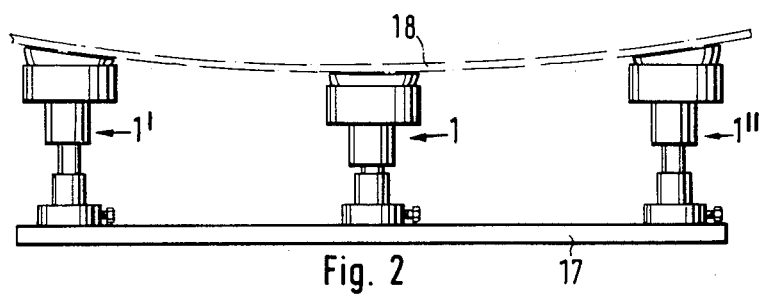
Fig. 2

HOLDING CURVED WORKPIECES

BACKGROUND OF THE INVENTION

The present invention relates to clamping, holding and releasably fastening workpieces, particularly workpieces of a thin configuration, but having large surfaces areas; more particularly, the present invention relates to holding such workpieces by means of low pressure suction.

U.S. Pat. No. 3,771,082 describes a system for holding, fastening and clamping workpieces under utilization of a relatively large machine tool table which is provided for holding and supporting individual fastening elements of various configurations and various constructions, whereby, in particular, in some instances certain features are provided for utilizing low pressure suction in one form or another including the suction of workpieces themselves. FIG. 25 of the patent discloses a particular mounting element which by and in itself is to be fastened on the machine tool table mentioned above and which is provided with a universally pivotable carrier permitting various angular orientations of a particular mounting surface and permitting also the application of a low pressure to the surface of the workpiece at which it is held and supported by that pivotable head. A particular holding element of this type is not necessarily used for fastening the workpiece per se, but for providing supplemental support and for preventing the workpiece from vibrating during working.

It can also be said that the present invention relates to improvements in the pivotable support of large area workpieces within a system as disclosed in said patent and practicing the best mode of the present invention can be understood to occur within a system of the general scope as per the above mentioned patent.

Workpieces of particular interest are, for example, thin metal sheets, such as they are used as skin covering for aircraft. Some of these sheets are, for example, manufactured and shaped to have a spherical or other well-defined curvature. This curvature must not be distorted so that it is required during further working of such a curved sheet to support it strictly commensurate with that shape and without deforming or distorting it generally or locally. In the past this problem has been solved by placing the workpiece onto a correspondingly shaped templet or the like and to fasten the workpiece in surface to surface engagement to that particular holder under utilization of suction and/or mechanical fastening elements. It it apparent that the particular templet is, of course, of very limited use; it serves as a holding element for one type of workpiece only, any workpiece having a different curvature or being larger will not be adequately supported and protected by such a templet. One must consider that in many instances a large variety of curvatures, curves and contured parts exists. Therefore, it is quite apparent that the amount of tooling needed is quite extensive; the reservoir of templets is substantial. This, of course, is in addition to the requirement that each of these templets must be very accurately manufactured in the first place.

DESCRIPTION OF THE INVENTION

It is an object of the present invention to provided a new improved method and equipment for holding, mounting, clamping and positioning workpieces such as curved sheet metal parts in a rather simple manner obviating the need for providing elements for such purpose with preshaped contures. Moreover, clamping and positioning of workpieces should be simple and require little expenditure.

It is another object of the present invention to provided a new and improved positioning, holding and mounting element for the positioning, holding and mounting of curved workpieces applicable in the systems generally as the type as disclosed in U.S. Pat. No. 3,711,082.

In accordance with the preferred embodiment of the present invention, it is suggested basically to provide a holding element having a sealed rim portion circumscribing a plenum chamber. That sealed portion is caused to engage the workpiece while high pressure is applied to permit the workpiece to slide in an air cushion like manner, following which low pressure is applied to the plenum which sucks the workpiece against the rim portion and holds it there. It is, morever, suggested to provide this holding element in a universal joint like manner i.e. for swiveling about two transverse axis whereby the center of such swivel motion is a point within the plane circumscribed by the sealing rim. The point, therefore, remains invariant upon swiveling and defines a hypothetical point of support for a workpiece engaged in actuality by the tiltable rim. The plenum may be repressurized prior to removal of the workpiece to permit lateral sliding off after working has been completed. In furtherance of the invention it is suggested to provide additional centering of the holding element relative to the workpiece by indexing the above defined central point to an aperture in the workpiece right in the central point area. The invention is particularly applicable for holding large area sheets which have been preshaped, for example, into a curved configuration by means of stretch drawing or otherwise, the parts to be used in the aircraft industry. Such a flat curved sheet part will be supported in the described manner in several, discreet, spaced apart and strategically located points which may also index the sheet as a whole in relation to machine tooling.

In furtherance of the invention it is particularly suggested to provide a base and a head part with a concavely shaped, spherical surface in which is seated a convex member having a rim portion around which a plenum is defined. Upon tilting or swiveling the convex member is and on the concave surface of the head, one central point circumscribed by the rim portion remains invariant which as stated above is in fact the hypothetical invariant point of support for the workpiece engaged in fact by the circumscribing rim. In between the convex member and the concave support surface an additional plenum with an aperture in the convex chamber may be provided, for example, through flattening of the convex member so that the low or high pressure is applied to the additional plenum chamber and the pressure conditions are transmitted to the first mentioned plenum chamber through the aperture. The hollow convex member may be provided in addition with an indexing pin, the tip of which is permitted in some form to engage an indexing bore in the workpiece to be positioned.

Holding element of the type referred to above is used in the plurality for holding a large area workpiece. The holding elements are arranged in discretely defined places, whereby, each particular convex member assumes a different tilt position depending upon the local surface orientation of the large, curved workpiece. The orientation of each convex member is, in fact more or less automatically adjusted depending upon the position of the workpiece. The height of each head carrying the tilting rim and convex member is preferably adjustable through a pin that extends down from the head; the adjustment is a vertical one and tilting occurs in two horizontal axis.

The invention is not limited to the embodiments described above, but all changes and modifications thereof not constituting departures from the spirit and scope of the invention are intended to be included.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompany drawings in which:

FIG. 1 is a cross section through an example of the preferred embodiment of the present invention for practicing the best mode thereof;

FIGS. 1a and 1b are cross sections through modified details of the device shown in FIG. 1;

FIG. 1c is a cross section through the same, but unmodified detail; and

FIG. 2 is a somewhat schematic section and plan view of a system for practicing the inventive method using devices of the type illustrated in FIG. 1.

DETAILED DESCRIPTION OF THE DRAWINGS

FIG. 1 illustrates a clamping, holding and fastening unit 1 which includes a foot part, pedestal or base 2 and a head 4 mounted on the foot or base part 2 by means of mounting and carrier pin 3. The foot part 2 supports slidably the mounting pin 3 so that the vertical position of the head 4 can be adjusted therewith. The pin 3 is provided with an indexing slot 23 and a fasteners screw 14 in foot part or base 2 has its front end inserted in that groove 23. This way pin 3 is prevented from turning and the adjusted vertical position of the pin 3 and head 4 can be arrested by clamping action of the screw 14.

The foot part 2 sits on a plate 17 which can be regarded in the general case as a mounting plate having indexing bores such as 27 which receive in this case the lower end of pin 3. The plate 17 may be provided with a regular array of such indexing bores, in order to provide definite positions into which such holding element as described with reference of FIG. 1 is to be placed. The indexing bores, such as bore 27, can be surrounded or otherwise associated with fastening bores or threaded bores such as 26, by means of which the foot part 2 is bolted to the plate 17 under utilization of appropriate screws 16.

The plate 17 is of general construction and should be so understood. However, it can also be said that in fact plate 17 may be generally of the type shown in the above mentioned U.S. Pat. No. 3,711,082, wherein, for example, the threaded bores, such as 26 above can be deemed to be represented by the bores (9) in the above identified patent. Alternatively, the plate 17 can also be understood as one of the particular mounting elements as shown in FIGS. 23 and 24 of said patent for establishing particular indexing points and for establishing fastening and bolt down points which are adjustable.

Moreover, it can be understood that the particular mounting plate shown in the above identified patent can be supplemented by indexing bores, such as 27 in the present case. In other words, the patent referred to above establishes a versatile system permitting a variety of circumstances and adjustable positions to be established, and the present holder is to be understood to be readily adaptable or specifically designed for utilization with such a plate, while on the other hand, the particular holder as presently described has a broader application and a different kind of mounting plate can be used for purposes of mounting the particular arrangement, and the plate 17 can be so understood.

The head part 4 is provided with a lower stem 24 and an upper carrying element 25. The stem 24 is provided to receive the upper end of pin 3 which is in effect bolted and screwed to that stem part. The upper portion 25 of head 4 is provided with a calotta or semispherically shaped convex surface 5 in which is mounted a particular clamping fastening and holder element 6. This holding element 6 is, generally speaking, of dish shape, or semispherical configuration except that the "sphere" is flattened and the other side does not extend quite to the equator of the respective sphere in the geometric sense. Vis a vis the concave surface 5 part 6 can be understood to be of hollow, convex configuration. The radius of that geometric sphere matches very closes the radius of the spherical opening 5.

The element 6 is provided with an upper rim portion 7 which receives an annular sealing element 8 having a cross section contour readily discernible from the drawing. The ring 8, therefore, provides an annular sealing ridge for sealing the surface of the part it engages relative to the interior of the semispherical element 6. Looking closely at the conture of the sealing ring 8, it can readily be seen that a flat surface of a workpiece which is urged against that ring will readily bend the outermost edge portion of the sealing ring 8 into a more or less planar configuration. That means the ring 8 will assume relative to the holding element 6 a particular planar orientation which to some extent depends on the pressure applied on account of the resiliency and elastic compressability of the ring 8; however, under well defined pressure conditions to be explained below, such a workpiece will assume a well defined position in relation to the holding element 6 as a whole. In this position one can say that such a surface is in fact coplanar with the plane of sealing of that ring 8 and of the rim construction of the holding element 6 as such. In this particular position the plane or surface of an object against which the ring 8 abuts will run through the point C the significant of which will become apparent more fully below suffice it to say at the present time that this point C is a central point about which the spherically shaped holding element 6 can pivot when caused to pivot within the concave bed of head bore as established by the surface 5.

The surface 5 is along the more outer peripheral portions provided with annular ridges defining two concentric closed annular grooves 95. The spherical clamping element 6 sits basically on the ridges separating the channel portion which is defined by these grooves. A pin 10 extends centrally from the flat part of clamping element 6 in radial direction as far as the spherical configuration is concerned, but axially as far as the pin 3 is concerned, as long as element 6 is in the central or neutral position. The tip portion of the pin 10 defines a supplemental support point for a workpiece held by the structure as a whole and by the holding element 6 in particular. The front end of this pin 10 may in fact extend right to the point C as defined above. However, it should be noted that point C is in fact the theoretical and geometrically established support point for a workpiece, but in view of particular circumstances the front of pin 10 may not necessarily be disposed for extension up to that point. For example, the support point C as so defined may in fact be located inside a workpiece to be supported and not on its surface. This may readily be understood for a case in which the workpiece is of a curved configuration and as a surface portion abuts ring 8 the center of that surface portion will project slightly into the interior 6a of the hollow holding element 6 in which case, of course, pin 10 has to be retracted slightly. Therefore, the position of the tip of pin 10 vis a vis the rim ring 8 must normally be adjusted to take that curvature of the workpiece into account.

The pin 10 may be firming anchored in the bottom of element 6 or it may have a collar 10a by means of which it is threaded into an appropriately threaded central bore of clamping unit 6 permitting its adjustment in order to offset any an diviation of the actually existing conditions from the theoretical ones as established by the above mentioned sphere center C. Generally speaking it must be established in practice that a particularly curved workpiece firmly engages the sealing ring 8 and mounting also the tip of pin 10.

FIG. 1a illustrates an alternative construction for the pin designated here by 10'; this particular pin has a blunt front end provided with a groove in which is disposed a sealing ring 21. The sealing ring 21 circumscribes a sleeve 20 with a flared end and being inserted in an appropriate bore in the front part of pin 10'. The purpose of this particular construction is to receive an indexing pin, particularly one end thereof; the other end of this indexing pin projects beyond the front end of pin 10' and is provided for being inserted in an appropriate bore of the workpiece. One will choose this particular construction when critically the workpiece is to have a well defined lateral position.

FIG. 1b illustrates a modification, the pin 10" is provided here with an integral indexing pinlet 30 projecting from a shoulder which receives also a sealing ring 31. The sealing ring 31 will engage the workpiece proper and the indexing pin or pinlet 30 will be inserted into an indexing bore of the workpiece as described.

Particularly in the latter case, when the indexing pin tip 30 is integral with the positioning pin 10" it will be necessary to mount that particular pin resilient to some extent in the clamping element 6 so that one can press down slightly pin 10", place and shift a workpiece until an indexing bore is aligned like pin 10. Upon releasing pin 10", the indexing tip 30 can be inserted in the properly positioned workpiece.

As indicated in FIG. 1c, the pin 10 may in addition serve another function, the element 35 depicted in the pin tip is a proximity sensor. This means that the device 35 gives off a signal i.e. an electrical signal as the pin tip approaches a workpiece surface. Such additional equipment may be advisable if the particular device is supplemented by an automated raising and lifting structure for the pin 3 carring head 4. The requisite structure is schematically indicated in FIG. 1 by reference numeral 15. The proximity measuring and sensing device 35 may thus be provided to signal the approach of a workpiece surface as the head on pin 3 is automatically moved up.

As proximity becomes contact the drive stops and have thereby positioned the holding element 6 into a position of abuttment with a workpiece surface whose proximity has just been established. The structure 15 may operate electrically, hydraulically or pneumatically. The screw 14 may still be needed in such a case because it may simply be more practical after the proper position has been established to fasten the device 14 and not to rely on holding forces or on a perpetuation of holding forces provided by the automated lifting and lowering device 15.

The bottom of clamping element 6 is as a whole resiliently mounted in head 4 under utilization of a tension spring 11. Spring 11, as illustrated, bears against the part 6 and receives the lower end of pin 10 as projecting from collar 10a. Alternatively, a suitable ear or the like may be provided in order to hold one end of the spring 11. The other end of the spring 11 is fastened to an ear which extends from one of the fastening screws by means of which the head 4 bore is mounted to the pin 3.

The spring 11 serves as a retracting element for centering or recentering the element 6 in case it is pivotably deflected in its spherical bed 5. The spring 11, therefore, establishes always or tends to establish a center position in which the axis of the pin 10 is aligned with the axis of pin 3. The spring is sufficiently strong so that in the case the device illustrated is not mounted a horizontal platform, such as 17, but extends laterally from a suitable mounting surface, spring 11 can still center the element 6 and prevents its sagging.

The platform 25 of the head part 4 is provided with a lateral bore 12 to be connected selectively to a source of air pressure (above atmospheric) or a low pressure source for purposes of suction. The clamping element 6 is provided with a small aperture 13 to admit high or low pressure, as the case may be, to the interior 6c of the bowl shaped clamping element 6. The interior 6a of hollow element 6 serves as plenum chamber for the application of particular pressure conditions, in effect between the rim portion and the workpiece surface that may abut. That plenum chamber communicates through aperture 13 with the other plenum chamber, 41, which is established between the flattened portion of holding element 6 and the continued concave surface 5 of head platform 25. The duct 12 communicates directly with that additional plenum chamber 41 so that pressure is applied to the plenum 6a via plenum 41.

Having described a particular mounting supporting, clamping, holding and fastening unit, I turn now to FIG. 2 for describing the utilization of a plurality of such units for purposes of mounting and supporting a relatively large, curved, thin metal sheet 18. As stated, plate 17 could be a table and fastening plate of the type described in the U.S. Pat. No. 3,711,082. Here it is particularly noted that the plate 17 or any other mounting plate is to provide a plurality of indexing positions and the particular mounting units 1, 1', 1" are to be disposed exactly in such indexing positions. This is, for example, of particular importance if bores are to be drilled in predetermined positions and locations of sheet 18. The drill will be accurately positioned with reference to the mounting plate 17 and its indexing positions. Therefore, it will be necessary to position and index and orient the sheet 18 with reference to the indexing positions of mounting plate 17 so that indeed bores will be drilled in the desired positions and locations. It may be assumed alternatively or additionally that the particular curved sheet, as illustrated, is to be particularly positioned for purposes of milling the edges or any other kind of precision work, and the respective tools are also positioned with reference to indexing positions of plate 17.

Originally the sheet 18 may have been straight and flat, but by means of stretch drawing it has assumed the curved configuration i.e. it is bent without internal tension. The three units 1, 1' and 1" all being constructed as illustrated with reference to FIG. 1 are at first particularly positioned on the plate 17 corresponding to the clamping and holding position they are to assume. In the next step, the respective heads on the respective pins, such as 3, are advanced such that the indexing and centering points C are located on a curve commensurate to the surface curvature of the sheet 18 which has not yet been so positioned. As the sheet is positioned, the respective clamping and holding units, such as 6, will swivel about pivot points coinciding with the respective support point C. That particular point is not changed by the swivel action, but the plane of the sealing ring 8 is tilted commensurate to the local deviation of the orientation of a sheet 18 from a true horizontal extension. The particular sheet can now in fact be positioned about any distortion.

The three units 1, 1', 1" and other units, for example, units arranged in a direction perpendicular to the plane of the drawing are all provided in number and distance depending upon the weight, strength, thickness, etc. of the sheet 18, because it must be avoided, of course, that the sheet sags under its own weight in between any two support points. Also, the number of holding points should be sufficient that indeed the part is held securely particularly when subjected to dislocating forces as they may be inherent the working process, such as milling. Also, of course, adequate space must be provided for access to the sheet 18.

The placement of a sheet 18 or other workpieces should be considered in some greater detail. Following the adjustment of the indexing and positioning pins 10 and their respective tips as described, the respective duct 12 is connected to a source of pressure. This in fact produces an air cushion tending to lift the sheet 18 off the sealing ring 8, the lifting may be very small, but it is sufficient to obtain an air cushion along rim 7, 8 on which the sheet 18 can slide. This way one can shift sheet 18 laterally into the desired position for a centering operation, including insertion of rim tips (30) into indexing bores in sheet 18. Moreover, the air pressure as applied to the respective chamber 41 between the holding part 6 and the curved surface 5 of the head 4 permits now the part 6 to slightly lift off surface 5 and the ridges defining the grooves 9 and 9' to a very minor extent, but sufficient in that the part 6 can easily swivel and adapt the orientation of the plane defined by sealing ring 8 to the local orientation of the sheet 18.

After the sheet 18 has been so positioned and the respective holding and clamping elements 6 have been properly oriented, the indexing pins it provided with pin tips such as 30 drop into the appropriate indexing bore in the sheet 18; in the case of a pin such as 10' FIG. 1a, separate indexing pins are placed through the respective indexing bore in sheet 18 and inserted in the respective sleeve 20.

Having thus positioned the sheet 18 the source of pressure is disconnected and the ducts 12 of the several units are connected to a suction and low pressure device. This has the effect of introducing low pressure in the plenum chamber 41 as well as in the plenum chamber 6a. Accordingly, the holding element 6 is urged against ridges between the grooves 9 and 9' and is held in the proper orientation against the head 4. Moreover, the sheet 18 is sucked against the sealing ring 8 at the indexing pin; particularly the shoulder of the respective sealing ring, such as 21 or 31 as the case may be, bear against the sheet's surface and position the sheet right at the preadjusted geometric center C in each of the holding units.

Having provided a multiple of such fastening, connection and holding points, the sheet 18 is firmly held and can now be worked as desired, such as drilled, milled, or the like. Upon completion of the work, suction is interrupted and the sheet 18 can simply be taken off the holding units. In order to facilitate this removal one may temporarily reconnect the several ducts 12 to the pressure source to generate the aforementioned air cushions permitting the sheet 8 to be lifted off with ease. This may be of particular interest in case the sheet 18 is rather large and one may wish to laterally slide it off the table rather than lift it.

It should be mentioned that one may provide one duct, such as 12 for a permanent connection to a pressure unit and a separate duct can be provided in platforms 25 for permanent connection to a suction unit. These two units are then simply controlled by on and off valves. The present system requires the provision of a manifold system for selective application of pressure and suction. Another modification which is possible, is to make use of the suction system in the support plate such as 17 if such suction is provided for. Reference again is made to the U.S. Pat. No. 3,711,082 mentioned above and which discloses a mounting table under inclusion of a suction and pressure system. In this case appropriate ducts must be provided in the bottom part such as the pin 3 or in the foot part 2 or the like in order to permit direct and immediate connection to the suction system or a pressure system within a supporting mounting plate.

The invention is not limited to the embodiments described above, but all changes and modifications thereof not constituting departures from the spirit and scope of the invention are intended to be included.

I claim:
1. A positioning and holding element for workpieces, having a base and a head part, the base provided for fastening to a stand, frame, table or the like, the head having a concave calotta shaped spherical surface the improvement comprising:
   a convex member seated in said concave surface, having a rim portion for engaging the surface of a workpiece and defining a plane of such engagement, the member being hollow for defining a plenum chamber;
   the concave and convex surfaces being configured so that upon tilting of the convex member in said concave surface a central point in said plane remains invarient; and
   means for applying high or lower pressure to the plenum chamber.
2. Positioning and holding element as in claim 1 and including a means for resiliently centering said convex member for returning the convex member into a particular position when not engaging a workpiece surface.
3. Positioning and holding element as in claim 2 the centering means being a spring.
4. A positioning and holding element as in claim 1 and including a pin extending into said planar chamber towards said central point.

5. Positioning and holding element as in claim 4, said pin including means at its tip for engagement with an aperture in a workpiece for purposes of centering.

6. Positioning and holding element as in claim 4, said pin being adjustable in longitudinal direction.

7. Positioning and holding element as in claim 1, said head being vertically adjustable relative to said base.

8. Positioning and holding element as in claim 1, said convex member in said head being configured to define an additional plenum chamber in between them, said means for applying high or low pressure, applying such pressure to said additional plenum, said convex member having aperture means for causing the first mentioned plenum chamber to communicate with the additional plenum chamber so that high or low pressure in the latter is effectively applied to the former.

9. A positioning and holding element as in claim 1 and rim being annular there being a sealing ring provided in the rim portion of said convex member.

10. A method for holding a large area workpiece comprising the step of using a plurality of holding elements as set forth in claim 1 to support said workpiece in different, well defined points at different orientations of said convex members.

* * * * *